(12) United States Patent
Beaty et al.

(10) Patent No.: US 8,601,471 B2
(45) Date of Patent: Dec. 3, 2013

(54) DYNAMICALLY MANAGING VIRTUAL MACHINES

(75) Inventors: Kirk A. Beaty, Golden Bridge, NY (US); Norman Bobroff, Katonah, NY (US); Gautam Kar, Yorktown Heights, NY (US); Gunjan Khanna, West Lafayette, IN (US); Andrzej Kochut, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 12/125,457

(22) Filed: May 22, 2008

(65) Prior Publication Data

US 2008/0222638 A1    Sep. 11, 2008

Related U.S. Application Data

(63) Continuation of application No. 11/364,449, filed on Feb. 28, 2006, now abandoned.

(51) Int. Cl.
  *G06F 9/455*    (2006.01)

(52) U.S. Cl.
  USPC .......................................................... 718/1

(58) Field of Classification Search
  USPC .......................................................... 718/1
  See application file for complete search history.

(56) References Cited

U.S. PATENT DOCUMENTS

| | | | |
|---|---|---|---|
| 5,367,473 A * | 11/1994 | Chu et al. | 702/186 |
| 5,506,987 A * | 4/1996 | Abramson et al. | 718/103 |
| 5,745,778 A * | 4/1998 | Alfieri | 712/1 |
| 5,953,338 A | 9/1999 | Ma et al. | |
| 6,732,139 B1 | 5/2004 | Dillenberger et al. | |
| 7,203,944 B1 * | 4/2007 | van Rietschote et al. | 718/104 |
| 7,310,684 B2 * | 12/2007 | Patrick et al. | 709/238 |
| 7,743,233 B2 * | 6/2010 | Wang et al. | 712/220 |
| 2001/0049741 A1 | 12/2001 | Skene et al. | |
| 2002/0107901 A1 | 8/2002 | Hay | |
| 2002/0194496 A1 | 12/2002 | Griffin et al. | |
| 2003/0099192 A1 | 5/2003 | Scott et al. | |
| 2003/0191838 A1 | 10/2003 | Tsao | |
| 2004/0163085 A1 | 8/2004 | Dillenberger et al. | |
| 2005/0120160 A1 | 6/2005 | Plouffe et al. | |
| 2006/0010443 A1 * | 1/2006 | Lahti et al. | 718/100 |

OTHER PUBLICATIONS

Exploiting Process Lifetime Distributions for Dynamic Load Balancing Downey et al ACM Transactions on Computer Systems, vol. 15, No. 3, Aug. 1997.*

* cited by examiner

*Primary Examiner* — Mengyao Zhe
(74) *Attorney, Agent, or Firm* — Anne V. Dougherty; Ryan, Mason & Lewis, LLP (57) ABSTRACT

Techniques for dynamic management of virtual machine environments are disclosed. For example, a technique for automatically managing a first set of virtual machines being hosted by a second set of physical machines comprises the following steps/operations. An alert is obtained that a service level agreement (SLA) pertaining to at least one application being hosted by at least one of the virtual machines in the first set of virtual machines is being violated. Upon obtaining the SLA violation alert, the technique obtains at least one performance measurement for at least a portion of the machines in at least one of the first set of virtual machines and the second set of physical machines, and a cost of migration for at least a portion of the virtual machines in the first set of virtual machines. Based on the obtained performance measurements and the obtained migration costs, an optimal migration policy is determined for moving the virtual machine hosting the at least one application to another physical machine.

14 Claims, 5 Drawing Sheets

EXAMPLE: UTIL(VM$_{11}$) < UTIL(VM$_{12}$) < UTIL(VM$_{1j}$)

FIG. 4

DYNAMICALLY MANAGING VIRTUAL MACHINES

CROSS-REFERENCE TO RELATED APPLICATION(S)

This application is a continuation of pending U.S. application Ser. No. 11/364,449 filed on Feb. 28, 2006, the disclosure of which is incorporated herein by reference.

FIELD OF THE INVENTION

This present invention generally relates to virtual machine environments and, more particularly, to techniques for dynamically managing virtual machines.

BACKGROUND OF THE INVENTION

An important problem encountered in today's information technology (IT) environment is known as server sprawl. Because of unplanned growth, many data centers today have large numbers of heterogeneous servers, each hosting one application and often grossly under utilized.

A solution to this problem is a technique known as server consolidation. In general, server consolidation involves converting each physical server or physical machine into a virtual server or virtual machine (VM), and then mapping multiple VMs to a physical machine, thus increasing utilization and reducing the required number of physical machines.

There are some critical runtime issues associated with a consolidated server environment. For example, due to user application workload changes or fluctuations, a critical problem often arises in these environments. The critical problem is that end user application performance degrades due to over utilization of critical resources in some of the physical machines. Accordingly, an existing allocation of VMs to physical machines may no longer satisfy service level agreement (SLA) requirements. As is known, an SLA is an agreement between a service customer (e.g., application owner) and a service provider (e.g., application host) that specifies the parameters of a particular service (e.g., minimum quality of service level). As a result, VMs may need to be reallocated to other physical machines. However, such a reallocation has an associated migration cost. Existing consolidation approaches do not account for the cost of migration.

SUMMARY OF THE INVENTION

Principles of the present invention provide techniques for dynamic management of virtual machine environments.

For example, in one aspect of the invention, a technique for automatically managing a first set of virtual machines being hosted by a second set of physical machines comprises the following steps/operations. An alert is obtained that a service level agreement (SLA) pertaining to at least one application being hosted by at least one of the virtual machines in the first set of virtual machines is being violated. Upon obtaining the SLA violation alert, the technique obtains at least one performance measurement for at least a portion of the machines in at least one of the first set of virtual machines and the second set of physical machines, and a cost of migration for at least a portion of the virtual machines in the first set of virtual machines. Based on the obtained performance measurements and the obtained migration costs, an optimal migration policy is determined for moving the virtual machine hosting the at least one application to another physical machine.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary SLA-based service provider environment. It should be understood, however, that the invention is not limited to use with such a particular environment. The invention is instead more generally applicable to any data processing or computing environment in which it would be desirable to manage virtual servers used to perform such data processing or computing operations.

It is to be appreciated that, as used herein, a "physical machine" or "physical server" refers to an actual computing device, while a "virtual machine" or "virtual server" refers to a logical object that acts as a physical machine. In one embodiment, the computing device may be a Blade™ available from International Business Machines Corporation (Armonk, N.Y.). A Blade™ includes a "thin" software layer called a Hypervisor™, which creates the virtual machine. A physical machine equipped with a Hypervisor™ can create multiple virtual machines. Each virtual machine can execute a separate copy of the operating system, as well as one or more applications.

As will be illustrated below, a methodology of the invention provides a polynomial time approximate solution for dynamic migration of virtual machines (VMs) to maintain SLA compliance. Such a management methodology minimizes associated cost of migration, allows dynamic addition or removal of physical machines as needed (in order to reduce total cost of ownership). The approach of the methodology is an iterative approach, which improves upon the existing solution of allocating VMs to physical machines. Moreover, the approach is independent of application software, and works with virtual machines at the operating system level. Such a methodology can be used as a part of a larger management system, e.g., the International Business Machines Corporation (Armonk, N.Y.) Director system, by using its monitoring mechanism and producing event action plans for automatic migration of VMs when needed.

Figure 1:
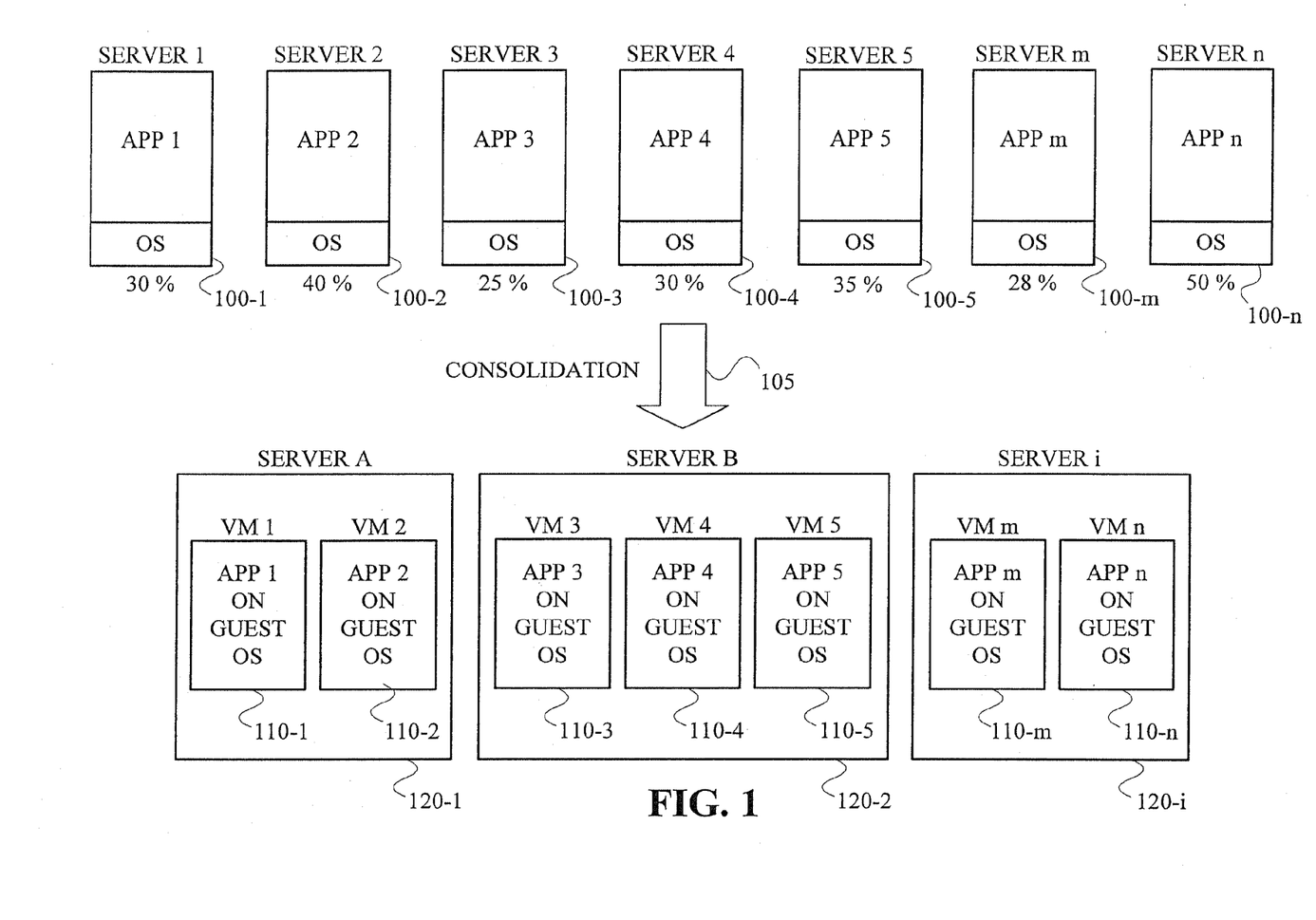
FIG. 1 illustrates an example of server consolidation.

Before describing an illustration of the inventive approach, an explanation of the basic steps and features of the server consolidation process is given in the context of FIG. 1.

As shown in FIG. 1, physical servers 100-1 through 100-n each host a separate application (App1 through Appn, respectively). However, as noted below each box representing the server, each application only utilizes between 25% and 50% of the processing capacity of the server. Thus, each server is considered under utilized.

Each physical server (100-1 through 100-$n$) is converted (step 105) into a virtual machine (VM1 through VMn denoted as 110-1 through 110-$n$, respectively) using available virtualization technology, e.g., available from VMWare or XenSource (both of Palo Alto, Calif.). Server virtualization is a technique that is well known in the art and is, therefore, not described in detail herein.

Multiple VMs are then mapped into a physical machine, using central processing unit (CPU) utilization, memory usage, etc. as metrics for resource requirements, thus increasing the utilization and reducing the total number of physical machines required to support the original set of applications. That is, as shown, the VMs are mapped into a lesser number of physical machines (120-1 through 120-$i$, where i is less than n). For example, App1 and App2 are now each hosted by server 120-1, which can be of the same processing capacity as server 100-1, but now is more efficiently utilized.

Typically, at the end of this consolidation process, the data center will consist of a fewer number of homogeneous servers, each loaded with multiple virtual machines (VMs), where each VM represents one of the original servers. The benefit of this process is that heterogeneity and server sprawl is reduced, resulting in less complex management processes and lower cost of ownership.

However, as mentioned above, there are several runtime issues associated with consolidated server environment. Due to application workload changes or fluctuations, end user application performance degrades due to over utilization of critical resources in some of the physical machines. Thus, an existing allocation of VM to physical machines may no longer satisfy SLA requirements. VMs may need to be reallocated to physical machines, which have an associated migration cost. Existing consolidation approaches do not account for the cost of migration.

Illustrative principles of the invention provide a solution to this problem using an automated virtual machine migration methodology that is deployable to dynamically balance the load on the physical servers with an overall objective of maintaining application SLAs. We assume that there is a cost associated with each migration. The inventive solution finds the best set of virtual machine migrations that restores the violated SLAs, and that minimizes the number of required physical servers, and minimizes the migration cost associated with the reallocation.

The methodology assumes that SLAs are directly related to metrics of the host, such as CPU utilization or memory usage. The inventive methodology is embodied in a virtual server management system that monitors those metrics and if any of them exceeds a predetermined threshold for a physical server or VM, one or more VMs from that physical machine is moved to another physical machine in order to restore acceptable levels of utilization. The VM chosen to be moved is the one with the smallest migration cost, as will be explained below. The chosen VM is moved to the physical machine which has the least residual capacity for the resource associated with that metric and is able to accommodate the VM. An overall objective is to maximize the variance of the utilization across all the existing physical servers, as will be explained below. The procedure is repeated until the SLA violation is corrected. The overall management methodology 200 is depicted on FIG. 2A, while the reallocation or migration methodology is illustrated in FIG. 2B.

Figure 2A:
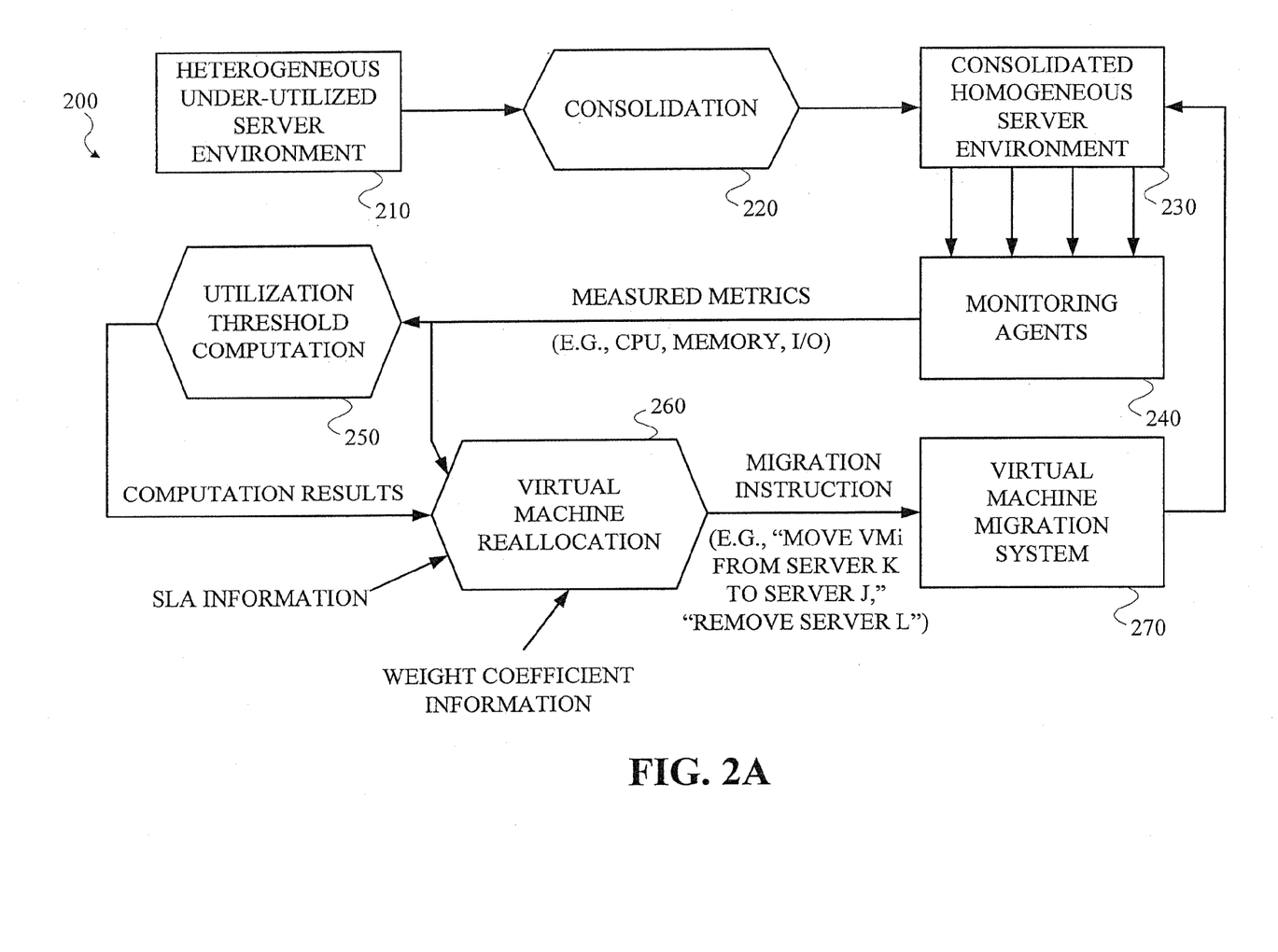
FIG. 2A illustrates a virtual server management methodology, according to an embodiment of the present invention.
Figure 2B:
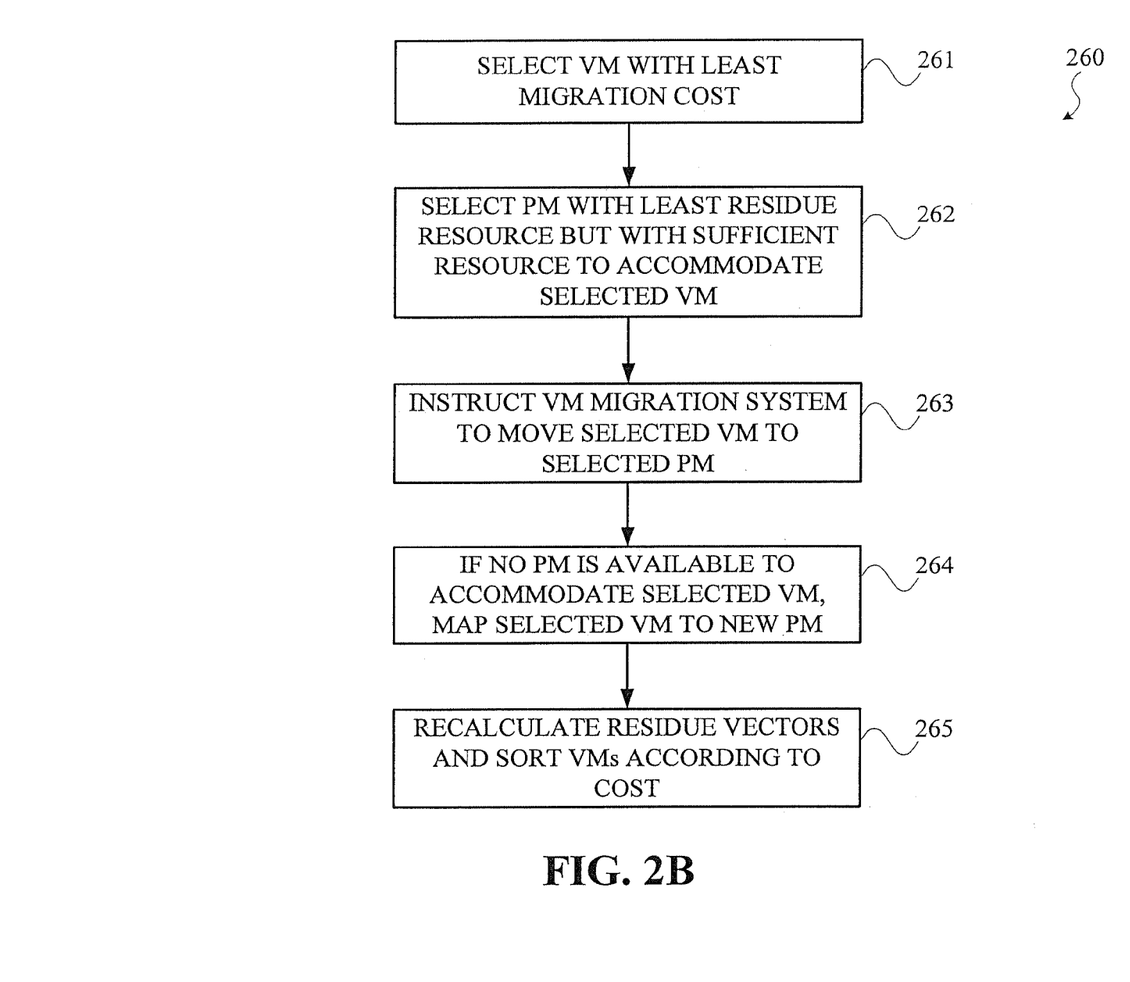
FIG. 2B illustrates a virtual machine reallocation methodology, according to an embodiment of the present invention.

As shown in FIG. 2A, a heterogeneous under-utilized server environment (block 210) is the input to server consolidation step 220. The server consolidation step 220 is the server virtualization process described above in the context of FIG. 1. Thus, the input to step 220 is data indicative of the heterogeneous under-utilized server environment, such as the environment including servers 100-1 through 100-$n$ in FIG. 1. This may include information regarding the application running on the physical server as well as server utilization information. Again, since the virtualization process is well known, as well as the data input thereto, a further description of this process is not given herein. The result of the server consolidation step is a consolidated homogenous environment (block 230). That is, server consolidation step 220 outputs a mapping of multiple VMs to physical servers, which serves to reduce heterogeneity and server sprawl.

As further shown in FIG. 2A, utilization values are monitored. This is accomplished by monitoring agents 240. That is, performance metrics or measurements such as CPU utilization, memory utilization, input/output utilization of each server in the consolidated environment are measured. The agents may simply be one or more software modules that compile these utilization values reported by the servers. It is to be appreciated that while a utilization value may be from a physical machine or a virtual machine, such values are preferably taken for both the physical machine and the virtual machine. For example, for three virtual machines executing on one physical machine, the system gathers CPU utilization values of the physical machine, three CPU utilization values denoting the virtual machines CPU usage, and CPU utilization due to the overhead of the Hypervisor™.

These utilization values are then compared to threshold values in step 250 to determine whether they are greater than, less than, or equal to, some predetermined threshold value for the respective type of utilization that is being monitored (e.g., CPU utilization threshold value, memory utilization value, input/output utilization value). Such thresholds are preferably thresholds generated based on the SLA that governs the agreed-upon requirements for hosting the application running on the subject server. For example, the SLA may require that a response to an end user query to an application running on the subject server be less than a certain number of seconds for a percentage of the requests. Based on knowledge of the processing capacity of the server, this requirement is easily translated into a threshold percentage for CPU capacity. Thus, the subject server hosting the application should never reach or exceed the threshold percent of its CPU capacity.

Accordingly, if the subject server is being under utilized (e.g., below the threshold value) or over utilized (e.g., greater than or equal to the threshold value), then the computation step will detect this condition and generate an appropriate alert, if necessary.

In this embodiment, when the server is being over utilized, an SLA violation alert is generated.

If such an SLA violation alert is generated, a VM reallocation methodology of the invention is then triggered in step 260. The input to the VM reallocation methodology includes: (i) utilization values (e.g., CPU, memory, I/O) as computed by the monitoring agents 240; (ii) SLA information related to the thresholds; (iii) metric thresholds as computed in the threshold computation step; and (iv) a weight coefficient vector specifying the importance of each utilization dimension to the overall cost function.

The cost of reallocation (also referred to as migration) of a VM is defined as a dot product of a vector representing utilization and the vector representing the weight coefficient. For example, the dimension of both these vectors would be 2, if we consider only two resource metrics, CPU utilization and memory usage. It is to be appreciated that these migration costs are computed and maintained by the reallocation component 260 of the virtual server management system 200 or, alternatively, by another component of the system.

By way of example, assume that for a particular VM that the metrics are [0.2, 0.5], where 0.2 denotes 20% CPU utilization and 0.5 denotes 50% memory usage and the cost vector is [5, 10], signifying that, in the total cost of migration, the CPU usage has a weight of 5 and the memory usage has a weight of 10. Then, the cost of migration for this example VM is: 0.2*5+0.5*10=6 units.

The reallocation methodology of 260 includes two steps. Assume $PM_1, PM_2, \ldots PM_m$ are the physical machines and $V_{ij}$ is the j-th virtual machine on $PM_i$. For each physical machine $PM_i$, the methodology maintains a list of virtual machines allocated to $PM_i$ ordered by non-decreasing migration cost, i.e., the first VM, $V_{i1}$, has the lowest cost. For each physical machine $PM_i$, the methodology calculates and stores a vector representing the residual capacity of $PM_i$. The methodology maintains the list of residual capacities in non-decreasing order of the L2 norms of the capacity vector. An example configuration of VMs and their parent physical machines is shown on FIG. 3.

As mentioned above, the reallocation algorithm is triggered by one of the monitored utilization values exceeding one of the utilization thresholds. Assume that a physical machine $PM_i$ exhibits a condition, whereby one of the measured metrics (e.g., CPU utilization) exceeds the set threshold. According to the reallocation methodology (illustrated in FIG. 2B), one of the associated VMs of the threshold-exceeding physical machine is chosen to migrate to another physical machine in the following manner:

(i) select the VM (e.g., $VM_{ij}$) which has associated therewith the least migration cost (step 261);

(ii) select the physical machine ($PM_j$) which has the least residue resource vector, but enough to accommodate $VM_{ij}$ (step 262);

(iii) instruct the virtual machine migration system (block 270 in FIG. 2A) to move $VM_{ij}$ to $PM_j$; (step 263);

(iv) if no physical machine is available to accommodate the virtual machine, a new physical machine is introduced into the server farm and $VM_{ij}$ is mapped thereto (step 264); and (v) recalculate the residue vectors and sort the VMs according to the costs (step 265).

It is to be understood that the reallocation methodology (step 260) generates one or more migration instructions, e.g., move $VM_1$ from $PM_1$ to $PM_2$, remove server $PM_3$, etc. The virtual machine migration system (block 270) then takes the instructions and causes them to be implemented in the consolidated homogeneous server environment (block 230). It is to be understood that existing products can be used for the virtual machine migration system, for example, the Virtual Center from VMWare (Palo Alto, Calif.).

The above heuristic is based on a goal of maximizing the variance of the residue vector, so that the physical machines are as closely packed as SLA requirements will allow, thus leading to a high overall utilization, minimizing the cost of migration and minimizing the need for introducing new physical machines. Further, it is to be appreciated that the virtual server management procedure is iterative in nature, i.e., the steps of FIG. 2A (and thus FIG. 2B) are repeated until all SLA violations are remedied. Still further, based on the iterative nature of the methodology, minimal migration moves are made for each triggering event. Also, the methodology serves to maximize physical server load variance.

Figure 3:
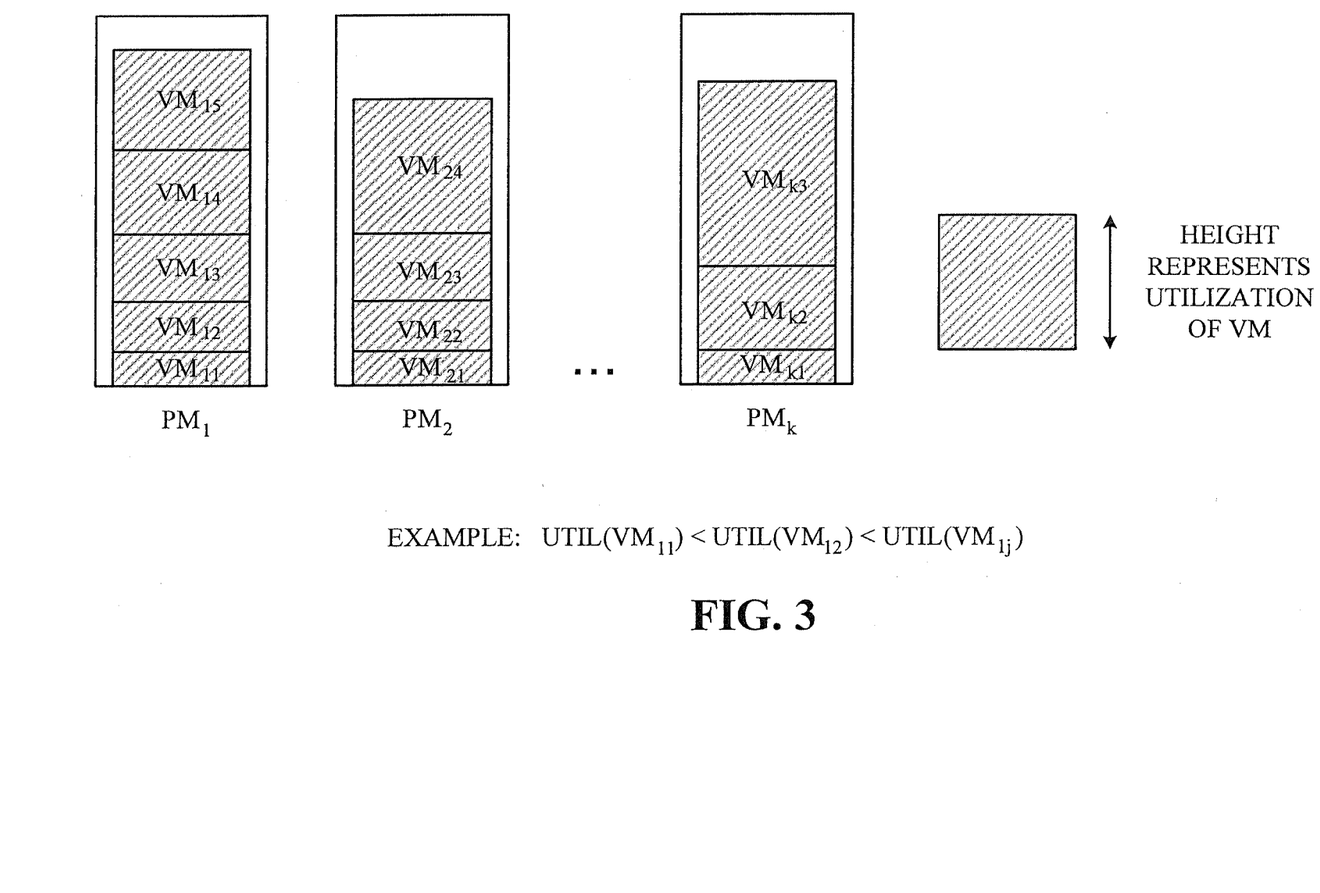
FIG. 3 illustrates an example mapping of virtual machines to physical machines.
Figure 4:
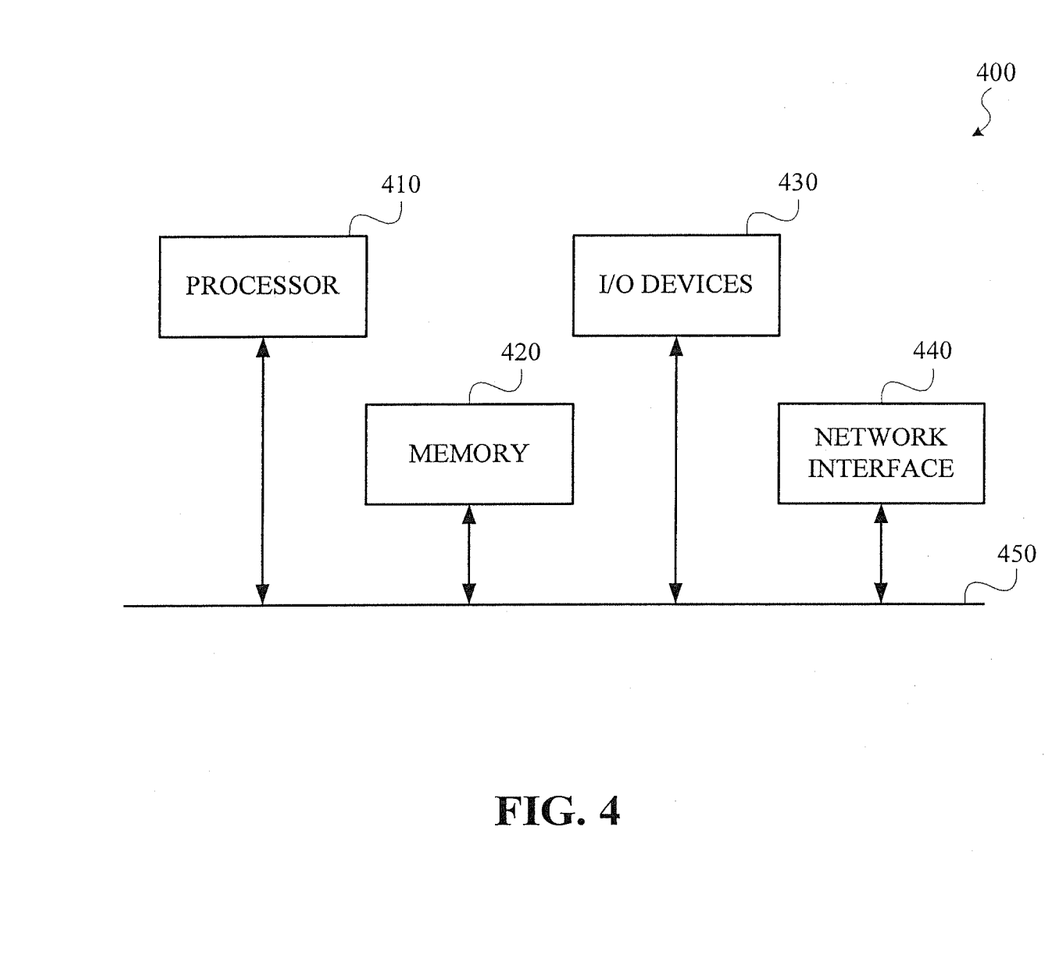
FIG. 4 illustrates a computing system in accordance with which one or more components/steps of a virtual server management system may be implemented, according to an embodiment of the present invention.

FIG. 4 illustrates a computing system in accordance with which one or more components/steps of the virtual server management techniques (e.g., components and methodologies described in the context of FIGS. 1 through 3) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 4 may represent one or more servers or one or more other processing devices capable of providing all or portions of the functions described herein.

As shown, the computing system architecture 400 may comprise a processor 410, a memory 420, I/O devices 430, and a network interface 440, coupled via a computer bus 450 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of automatically managing a first set of virtual machines being hosted by a second set of physical machines, comprising the steps of:
   obtaining an alert that a service level agreement (SLA) pertaining to at least one application being hosted by at least one of the virtual machines in the first set of virtual machines is being violated;
   upon obtaining the SLA violation alert, performing a virtual machine reallocation process to reallocate at least one virtual machine hosting said application from one physical machine to another physical machine to restore the violated SLA, wherein performing a virtual machine reallocation process comprises:
      obtaining at least one performance measurement for at least a portion of the virtual machines in the first set of virtual machines and for at least a portion of the physical machines in the second set of physical machines;
      obtaining a cost of migration for at least a each virtual machine in said portion of the virtual machines based on the at least one performance measurement obtained for each of said virtual machines, wherein the cost of migration is a cost associated with reallocating a virtual machine from one physical machine to another physical machine;
      selecting one of said virtual machines, which has a least migration cost associated therewith, to be reallocated from one physical machine to another physical machine;
      using the performance measurement obtained for each of said physical machines to determine which of said physical machines has a lowest available resource residue of a resource associated with the given performance measurement, but sufficient to accommodate the virtual machine selected for reallocation; and
      generating an instruction to move the selected virtual machine to a physical machine that is determined to have the lowest available resource residue,
   wherein one or more of the obtaining, selecting, using and generating steps are performed at least in part by a processor device operatively coupled to a memory device.

2. The method of claim 1, wherein performing a virtual machine reallocation process further comprises the step of recalculating resource residues for the second set of physical machines.

3. The method of claim 2, wherein performing a virtual machine reallocation process further comprises the step of sorting the first set of virtual machines according to migration costs.

4. The method of claim 1, wherein when the second set of physical machines does not include a physical machine that can accommodate the virtual machine selected for reallocation, mapping the selected virtual machine to a physical machine that is not in the second set of physical machines.

5. The method of claim 1, wherein at least a portion of the steps of performing a virtual machine reallocation process are iteratively performed until the SLA violation is remedied.

6. An apparatus for automatically managing a first set of virtual machines being hosted by a second set of physical machines, comprising:
   a memory; and
   at least one processor coupled to the memory and operative to:
      obtain an alert that a service level agreement (SLA) pertaining to at least one application being hosted by at least one of the virtual machines in the first set of virtual machines is being violated; and
      upon obtaining the SLA violation alert, performing a virtual machine reallocation process to reallocate at least one virtual machine hosting said application from one physical machine to another physical machine to restore the violated SLA, wherein performing a virtual machine reallocation process comprises:
         obtaining at least one performance measurement for at least a portion of the virtual machines in the first set of virtual machines and for at least a portion of the physical machines in the second set of physical machines;
         obtaining a cost of migration for each virtual machine in said portion of the virtual machines based on the at least one performance measurement obtained for each of said virtual machines, wherein the cost of migration is a cost associated with reallocating a virtual machine from one physical machine to another physical machine;
         selecting one of said virtual machines, which has a least migration cost associated therewith, to be reallocated from one physical machine to another physical machine; and
         using the performance measurement obtained for each of said physical machines to determine which of said physical machines has a lowest available resource residue of a resource associated with the given performance measurement, but sufficient to accommodate the virtual machine selected for reallocation; and
         generating an instruction to move the selected virtual machine to a physical machine that is determined to have the lowest available resource residue.

7. The apparatus of claim 6, wherein performing a virtual machine reallocation process further comprises recalculating resource residues for the second set of physical machines.

8. The apparatus of claim 7, wherein performing a virtual machine reallocation process further comprises sorting the first set of virtual machines according to migration costs.

9. The apparatus of claim 6, wherein when the second set of physical machines does not include a physical machine that can accommodate the virtual machine selected for reallocation, mapping the selected virtual machine to a physical machine that is not in the second set of physical machines.

10. The apparatus of claim 6, wherein at least a portion of the virtual machine reallocation process is iteratively performed until the SLA violation is remedied.

11. An article of manufacture for automatically managing a first set of virtual machines being hosted by a second set of physical machines, comprising a non-transitory machine readable storage medium containing one or more programs which when executed implement the steps of:
   upon obtaining the SLA violation alert, performing a virtual machine reallocation process to reallocate at least one virtual machine hosting said application from one physical machine to another physical machine to restore the violated SLA, wherein performing a virtual machine reallocation process comprises:
      obtaining at least one performance measurement for at least a portion of the virtual machines in the first set of virtual machines and for at least a portion of the physical machines in the second set of physical machines;
      obtaining a cost of migration for each virtual machine in said portion of the virtual machines based on the at least one performance measurement obtained for each of said virtual machines, wherein the cost of migration is a cost associated with reallocating a virtual machine from one physical machine to another physical machine;

selecting one of said virtual machines, which has a least migration cost associated therewith, to be reallocated from one physical machine to another physical machine; and using the performance measurement obtained for each of said physical machines to determine which of said physical machines has a lowest available resource residue of a resource associated with the given performance measurement, but sufficient to accommodate the virtual machine selected for reallocation; and generating an instruction to move the selected virtual machine to a physical machine that is determined to have the lowest available resource residue.

12. The method of claim 1, wherein the cost of migration of a given virtual machine is based on a product of a vector representing the at least one performance measurement and a weight coefficient vector specifying an importance of each performance measurement to an overall cost.

13. The apparatus of claim 6, wherein the cost of migration of a given virtual machine is based on a product of a vector representing the at least one performance measurement and a weight coefficient vector specifying an importance of each performance measurement to an overall cost.

14. The article of manufacture of claim 11, wherein the cost of migration of a given virtual machine is based on a product of a vector representing the at least one performance measurement and a weight coefficient vector specifying an importance of each performance measurement to an overall cost.

* * * * *